(12) United States Patent
Martin (10) Patent No.: US 11,867,127 B2
(45) Date of Patent: Jan. 9, 2024

(54) PLANETARY GEARBOX

(71) Applicant: ROLLS-ROYCE DEUTSCHLAND LTD & CO KG, Blankenfelde-Mahlow (DE)

(72) Inventor: Ivo Martin, Berlin (DE)

(73) Assignee: ROLLS-ROYCE DEUTSCHLAND LTD & CO KG, Blankenfelde-Mahlow (DE)

( * ) Notice: Subject to any disclaimer, the term of this patent is extended or adjusted under 35 U.S.C. 154(b) by 0 days.

(21) Appl. No.: 17/893,851

(22) Filed: Aug. 23, 2022

(65) Prior Publication Data

US 2023/0063819 A1 Mar. 2, 2023

(30) Foreign Application Priority Data

Aug. 31, 2021 (DE) ...................... 10 2021 209 552.6

(51) Int. Cl.
*F02C 7/36* (2006.01)
*F02C 7/06* (2006.01)

(52) U.S. Cl.
CPC ................. *F02C 7/36* (2013.01); *F02C 7/06* (2013.01); *F05D 2220/36* (2013.01); *F05D 2260/40311* (2013.01); *F05D 2260/98* (2013.01)

(58) Field of Classification Search
CPC .......... F02C 7/36; F02C 7/06; F05D 2220/36; F05D 2260/40311; F05D 2260/98
See application file for complete search history.

(56) References Cited

U.S. PATENT DOCUMENTS

| 5,472,383 A | 12/1995 | McKibbin |
| 9,810,312 B2 | 11/2017 | Obayashi et al. |
| 2013/0095974 A1 | 4/2013 | Mai et al. |
| 2016/0146102 A1* | 5/2016 | McCune ................. F02C 3/107 415/122.1 |

FOREIGN PATENT DOCUMENTS

| DE | 102018113753 A1 | 12/2019 |
| EP | 3851653 A1 | 7/2021 |

OTHER PUBLICATIONS

German Search Report dated Apr. 27, 2022 from counterpart German Patent Application No. 10 2021 209 552.6.

* cited by examiner

*Primary Examiner* — Jacob M Amick
*Assistant Examiner* — Charles J Brauch
(74) *Attorney, Agent, or Firm* — SHUTTLEWORTH & INGERSOLL, PLC; Timothy J. Klima (57) ABSTRACT

The invention concerns a planetary gear box with a flow guidance device for a planet gear lubricant stream in the planetary gear box, which is directed at least partially along a planet gear after an engagement with a sun gear, characterized by a collecting region of the flow guidance device in which the planet gear lubricant stream between the planet gear and the flow guidance device can be at least partially captured, and wherein the collecting region has an outlet region between the flow guidance device and the tooth face of the planet gear for at least a part of the planet gear lubricant stream, and an edge is arranged at the outlet region for defined constriction of the passage for the planet gear lubricant stream.

13 Claims, 6 Drawing Sheets

PLANETARY GEARBOX

This application claims priority to German Patent Application 102021209552.6 filed Aug. 31, 2021, the entirety of which is incorporated by reference herein.

The present disclosure relates to a planetary gear box having features as disclosed herein.

The lubrication and cooling of planetary gear boxes, usually by means of oil, is of great importance since there are numerous tooth flank contacts inside the gear box. In particular when used in gas turbine engines of aircraft, lubrication of great importance since these planetary gear boxes must remain functioning for a very long time without the possibility of maintenance of the planetary gear boxes.

There is therefore a need to provide planetary gear boxes with an efficient lubrication.

According to a first aspect, a planetary gear box has a flow guidance device for a planet gear lubricant stream in the planetary gear box. The planet gear lubricant stream is a lubricant stream which forms in the planetary gear box and extends along the tooth surfaces and/or the periphery of a planet gear.

The planet gear lubricant stream is oriented at least partially along a planet gear, in particular after an engagement with a sun gear.

The flow guidance device has a collecting region in which the planet gear lubricant stream between the planet gear and the flow guidance device can be at least partially captured, and wherein the collecting region has an outlet region between the flow guidance device and the tooth face of the planet gear for at least a part of the planet gear lubricant stream. This means that a part of the planet gear lubricant stream is conveyed through the outlet region, i.e. oil is present for example between the tooth flanks and/or in the gap at the planet gear, while another part of the oil may e.g. be discharged.

An edge is arranged at the outlet region for defined constriction of the passage for the planet gear lubricant stream.

By use of a sharp edge, the proportion of the lubricant carried along by the rotation of the planet gear may be reduced so that, in particular, crushing losses of oil on the ring gear can be avoided. Thus an ageing of the oil can be avoided, leading to a longer service life.

In one embodiment, an angle, measured in the rotational direction of the planet gear between the edge and a tangent to the planet gear, is greater than 90°, in particular less than 180°, quite particularly less than 120°. Thus the planet gear lubricant stream flowing onto the edge always meets a hard edge.

Also, the main flow direction of the planet gear lubricant stream may be oriented from an oil supply to the collecting region of the flow guidance device, the edge or the outlet region of the flow guidance device, so that as much lubricant as possible is captured.

Since a geometrically exact alignment of the main flow direction of the planet stream may not always be possible with accuracy, the main flow direction may deviate by +/−20°, in particular +/−10° from an exact linear geometric orientation.

For an efficient lubricant supply, in one embodiment, a sun gear lubricant stream may be oriented from an oil supply onto the engagement between the sun gear and the planet gear.

For an efficient discharge of the oil, the flow guidance device, in particular the collecting region of the flow guidance device, may be fluidically connected to an oil discharge device.

In order to capture as much of the planetary gear lubricant stream as possible, in one embodiment the flow cross-section of the outlet region of the collecting region may be between 0.5 mm and 4 mm. In principle, the flow cross-section should be as small as possible. Here, the flow cross-section of the outlet region of the collecting region may be designed to be adjustable by an adjustment device, so that the oil supply can be adapted to different operating states.

For example, the angle of the edge relative to the planet gear, and/or the distance from the planet gear, may be adjustable by the adjustment device.

Furthermore, in one embodiment, the flow guidance device may have at least partially a concave region which is open to the collecting region and in particular is part of the collecting region.

Such a planetary gear box may be used in a gas turbine engine for an aircraft.

As noted elsewhere herein, the present disclosure may relate to a gas turbine engine, for example an aircraft engine. Such a gas turbine engine may comprise a core engine comprising a turbine, a combustor, a compressor, and a core shaft connecting the turbine to the compressor. Such a gas turbine engine may comprise a fan (with fan blades) which is positioned upstream of the core engine.

Arrangements of the present disclosure may be advantageous in particular, but not exclusively, for geared fans, which are driven via a gear box. Accordingly, the gas turbine engine may comprise a gear box which is driven via the core shaft and whose output drives the fan in such a way that it has a lower rotational speed than the core shaft. The input to the gear box may be provided directly from the core shaft, or indirectly via the core shaft, for example via a spur shaft and/or spur gear. The core shaft may be connected rigidly to the turbine and the compressor, such that the turbine and compressor rotate at the same rotational speed (with the fan rotating at a lower rotational speed).

The gas turbine engine as described and/or claimed herein may have any suitable general architecture. For example, the gas turbine engine may have any desired number of shafts that connect turbines and compressors, for example one, two or three shafts. Purely by way of example, the turbine connected to the core shaft may be a first turbine, the compressor connected to the core shaft may be a first compressor, and the core shaft may be a first core shaft. The core engine may furthermore comprise a second turbine, a second compressor, and a second core shaft, which connects the second turbine to the second compressor. The second turbine, the second compressor and the second core shaft may be arranged so as to rotate at a higher rotational speed than the first core shaft.

In such an arrangement, the second compressor may be positioned axially downstream of the first compressor. The second compressor may be arranged to receive (for example directly receive, for example via a generally annular duct) a flow from the first compressor.

The gear box may be designed to be driven by the core shaft that is configured to rotate (for example during use) at the lowest rotational speed (for example the first core shaft in the example above). For example, the gear box may be designed to be driven only by the core shaft that is configured to rotate (for example during use) at the lowest rotational speed (for example only by the first core shaft and not by the second core shaft, in the example above). Alternatively, the gear box may be designed to be driven by one or more shafts, for example the first and/or second shaft in the example above.

In a gas turbine engine as described and/or claimed herein, a combustor may be provided axially downstream of the fan and compressor (or compressors). For example, the combustor may be directly downstream of (for example at the exit of) the second compressor, if a second compressor is provided. By way of a further example, the flow at the exit of the compressor may be fed to the inlet of the second turbine, when a second turbine is provided. The combustor may be provided upstream of the turbine(s).

The or each compressor (for example the first compressor and the second compressor as described above) may comprise any number of stages, for example multiple stages. Each stage may comprise a series of rotor blades and a series of stator blades, which may be variable stator blades (that is to say the angle of attack may be variable). The series of rotor blades and the series of stator blades may be axially offset from one another.

The or each turbine (for example the first turbine and the second turbine as described above) may comprise any number of stages, for example multiple stages. Each stage may comprise a row of rotor blades and a row of stator blades. The series of rotor blades and the series of stator blades may be axially offset from one another.

Each fan blade may have a radial span extending from a root (or a hub) at a radially inner location over which gas flows, or from a span position of 0%, to a tip at a span position of 100%. The ratio of the radius of the fan blade at the hub to the radius of the fan blade at the tip may be less than (or of the order of) any of the following: 0.4, 0.39, 0.38, 0.37, 0.36, 0.35, 0.34, 0.33, 0.32, 0.31, 0.3, 0.29, 0.28, 0.27, 0.26 or 0.25. The ratio of the radius of the fan blade at the hub to the radius of the fan blade at the tip may be in a closed interval delimited by two values in the previous sentence (that is to say the values may form upper or lower limits). These ratios can commonly be referred to as the hub-to-tip ratio. The radius at the hub and the radius at the tip may both be measured at the leading edge (or the axially forwardmost edge) of the blade. The hub-to-tip ratio refers, of course, to that portion of the fan blade over which gas flows, i.e. the portion radially outside any platform.

The radius of the fan may be measured between the engine centreline and the tip of the fan blade at its leading edge. The diameter of the fan (which can generally be double the radius of the fan) may be larger than (or of the order of): 250 cm (approximately 100 inches), 260 cm, 270 cm (approximately 105 inches), 280 cm (approximately 110 inches), 290 cm (approximately 115 inches), 300 cm (approximately 120 inches), 310 cm, 320 cm (approximately 125 inches), 330 cm (approximately 130 inches), 340 cm (approximately 135 inches), 350 cm, 360 cm (approximately 140 inches), 370 cm (approximately 145 inches), 380 cm (approximately 150 inches), or 390 cm (approximately 155 inches). The fan diameter may be in an inclusive range bounded by any two of the values in the previous sentence (i.e. the values may form upper or lower bounds).

The rotational speed of the fan may vary in operation. Generally, the rotational speed is lower for fans with a larger diameter. Purely as a non-limiting example, the rotational speed of the fan under cruise conditions may be less than 2500 rpm, for example less than 2300 rpm. Purely by way of a further non-limiting example, the rotational speed of the fan under cruise conditions for an engine having a fan diameter in the range of from 250 cm to 300 cm (for example 250 cm to 280 cm) may be in the range of from 1700 rpm to 2500 rpm, for example in the range of from 1800 rpm to 2300 rpm, for example in the range of from 1900 rpm to 2100 rpm. Purely by way of a further non-limiting example, the rotational speed of the fan under cruise conditions for an engine having a fan diameter in the range of from 320 cm to 380 cm may be in the range of from 1200 rpm to 2000 rpm, for example in the range of from 1300 rpm to 1800 rpm, for example in the range of from 1400 rpm to 1600 rpm.

During the use of the gas turbine engine, the fan (with associated fan blades) rotates about an axis of rotation. This rotation results in the tip of the fan blade moving with a speed $U_{tip}$. The work done by the fan blades on the flow results in an enthalpy rise dH of the flow. A fan tip loading may be defined as $dH/U_{tip}^2$, where dH is the enthalpy rise (for example the average 1-D enthalpy rise) across the fan and $U_{tip}$ is the (translational) speed of the fan tip, for example at the leading edge of the tip (which may be defined as fan tip radius at the leading edge multiplied by angular speed). The fan tip loading at cruise conditions may be more than (or of the order of): 0.3, 0.31, 0.32, 0.33, 0.34, 0.35, 0.36, 0.37, 0.38, 0.39, or 0.4 (wherein all units in this passage are $Jkg^{-1}K^{-1}/(ms^{-1})^2$). The fan tip loading may be in an inclusive range bounded by any two of the values in the previous sentence (i.e. the values may form upper or lower bounds).

Gas turbine engines in accordance with the present disclosure can have any desired bypass ratio, wherein the bypass ratio is defined as the ratio of the mass flow rate of the flow through the bypass duct to the mass flow rate of the flow through the core at cruise conditions. In the case of some arrangements, the bypass ratio can be more than (or of the order of): 10, 10.5, 11, 11.5, 12, 12.5, 13, 13.5, 14, 14.5, 15, 15.5, 16, 16.5, or 17. The bypass ratio may be in an inclusive range bounded by any two of the values in the previous sentence (i.e. the values may form upper or lower bounds). The bypass duct may be substantially annular. The bypass duct may be situated radially outside the core engine. The radially outer surface of the bypass duct may be defined by an engine nacelle and/or a fan case.

The overall pressure ratio of a gas turbine engine as described and/or claimed herein may be defined as the ratio of the ram pressure upstream of the fan to the ram pressure at the exit of the highest pressure compressor (before entry into the combustor). By way of a non-limiting example, the overall pressure ratio of a gas turbine engine as described and/or claimed herein at constant speed can be greater than (or in the magnitude of): 35, 40, 45, 50, 55, 60, 65, 70, 75. The overall pressure ratio may be in an inclusive range bounded by any two of the values in the previous sentence (i.e. the values may form upper or lower bounds).

The specific thrust of an engine may be defined as the net thrust of the engine divided by the total mass flow through the engine. The specific thrust of an engine as described and/or claimed herein at cruise conditions may be less than (or of the order of magnitude of): 110 $Nkg^{-1}s$, 105 $Nkg^{-1}s$, 100 $Nkg^{-1}s$, 95 $Nkg^{-1}s$, 90 $Nkg^{-1}s$, 85 $Nkg^{-1}s$ or 80 $Nkg^{-1}s$. The specific thrust may be in an inclusive range bounded by any two of the values in the previous sentence (i.e. the values may form upper or lower bounds). Such engines can be particularly efficient in comparison with conventional gas turbine engines.

A gas turbine engine as described and/or claimed herein may have any desired maximum thrust. Purely by way of a non-limiting example, a gas turbine as described and/or claimed herein may be capable of generating a maximum thrust of at least (or of the order of magnitude of): 160 kN, 170 kN, 180 kN, 190 kN, 200 kN, 250 kN, 300 kN, 350 kN, 400 kN, 450 kN, 500 kN or 550 kN. The maximum thrust may be in an inclusive range bounded by any two of the values in the previous sentence (i.e. the values may form upper or lower bounds). The thrust referred to above may be the maximum net thrust under standard atmospheric conditions at sea level plus 15° C. (ambient pressure 101.3 kPa, temperature 30° C.), with the engine static.

During use, the temperature of the flow at the entry to the high-pressure turbine can be particularly high. This temperature, which may be referred to as TET, may be measured at the exit to the combustor, for example directly upstream of the first turbine blade, which in turn may be referred to as a nozzle guide blade. At cruising speed, the TET may be at least (or of the order of magnitude of): 1400 K, 1450 K, 1500 K, 1550 K, 1600 K or 1650 K. The TET at cruise may be in an inclusive range bounded by any two of the values in the previous sentence (i.e. the values may form upper or lower bounds). The maximum TET in the use of the engine may be at least (or of the order of magnitude of), for example: 1700 K, 1750 K, 1800 K, 1850 K, 1900 K, 1950 K or 2000 K. The maximum TET may be in an inclusive range bounded by any two of the values in the previous sentence (i.e. the values may form upper or lower bounds). The maximum TET may occur, for example, under a high thrust condition, for example under a maximum take-off thrust (MTO) condition.

A fan blade and/or airfoil portion of a fan blade described and/or claimed herein may be produced from any suitable material or combination of materials. For example at least a part of the fan blade and/or airfoil may be produced at least in part from a composite, for example a metal matrix composite and/or an organic matrix composite, such as carbon fibre. As a further example, at least a part of the fan blade and/or aerofoil may be produced at least in part from a metal, such as e.g. a titanium-based metal or an aluminium-based material (such as e.g. an aluminium-lithium alloy) or a steel-based material. The fan blade may comprise at least two regions produced using different materials. For example, the fan blade may have a protective leading edge, which is produced using a material that is better able to resist impact (for example from birds, ice or other material) than the rest of the blade. Such a leading edge may, for example, be produced using titanium or a titanium-based alloy. Thus, purely by way of example, the fan blade may have a carbon-fibre-based or aluminium-based body (such as an aluminium-lithium alloy) with a titanium leading edge.

A fan as described and/or claimed herein may comprise a central portion, from which the fan blades may extend, for example in a radial direction. The fan blades may be attached to the central portion in any desired manner. For example, each fan blade may comprise a fixture device which can engage with a corresponding slot in the hub (or disk). Purely as an example, such a fixture may be in the form of a dovetail that may slot into and/or be brought into engagement with a corresponding slot in the hub/disk in order to fix the fan blade to the hub/disk. By way of further example, the fan blades may be formed integrally with a central portion. Such an arrangement may be referred to as a blisk or a bling. Any arbitrary suitable method may be used for production of such a blisk or bling. For example, at least a part of the fan blades may be machined from a block and/or at least part of the fan blades may be attached to the hub/disk by welding, such as for example linear friction welding.

The gas turbine engines described and/or claimed herein may or may not be provided with a variable area nozzle (VAN). Such a variable area nozzle can allow the exit cross section of the bypass duct to be varied during operation. The general principles of the present disclosure can apply to engines with or without a VAN.

The fan of a gas turbine as described and/or claimed herein may have any desired number of fan blades, for example 16, 18, 20, or 22 fan blades.

As used herein, cruise conditions may mean the cruise conditions of an aircraft to which the gas turbine engine is attached. Such cruise conditions can be conventionally defined as the conditions at mid-cruise, for example the conditions experienced by the aircraft and/or the engine between (in terms of time and/or distance) the top of climb and the start of descent.

Purely by way of example, the forward speed at the cruise condition may be any point in the range of from Mach 0.7 to 0.9, for example 0.75 to 0.85, for example 0.76 to 0.84, for example 0.77 to 0.83, for example 0.78 to 0.82, for example 0.79 to 0.81, for example of the order of Mach 0.8, of the order of Mach 0.85 or in the range of from 0.8 to 0.85. Any arbitrary speed within these ranges can be the constant cruise condition. In the case of some aircraft, the constant cruise conditions may be outside these ranges, for example below Mach 0.7 or above Mach 0.9.

Purely by way of example, the cruise conditions may correspond to standard atmospheric conditions at an altitude that is in the range of from 10000 m to 15000 m, for example in the range of from 10000 m to 12000 m, for example in the range of from 10400 m to 11600 m (around 38000 ft), for example in the range of from 10500 m to 11500 m, for example in the range of from 10600 m to 11400 m, for example in the range of from 10700 m (around 35000 ft) to 11300 m, for example in the range of from 10800 m to 11200 m, for example in the range of from 10900 m to 11100 m, for example of the order of 11000 m. The cruise conditions may correspond to standard atmospheric conditions at any given altitude in these ranges.

Purely by way of example, the cruise conditions may correspond to the following: a forward Mach number of 0.8, a pressure of 23000 Pa and a temperature of −55° C.

As used anywhere herein, "cruising speed" or "cruise conditions" may mean the aerodynamic design point. Such an aerodynamic design point (or ADP) may correspond to the conditions (including, for example, the Mach number, ambient conditions and thrust requirement) for which the fan operation is designed. This may mean, for example, the conditions under which the fan (or gas turbine engine) has the optimum efficiency in terms of construction.

During operation, a gas turbine engine described and/or claimed herein may be operated under the cruise conditions defined elsewhere herein. Such cruise conditions may be determined by the cruise conditions (for example the conditions during the middle part of the flight) of an aircraft to which at least one (for example two or four) gas turbine engine(s) can be fastened in order to provide propulsive thrust.

It is self-evident to a person skilled in the art that a feature or parameter described in relation to one of the above aspects may be applied to any other aspect, unless these are mutually exclusive. Furthermore, any feature or any parameter described here may be applied to any aspect and/or combined with any other feature or parameter described here, unless these are mutually exclusive.

Embodiments will now be described by way of example with reference to the figures, in which.

Figure 1:
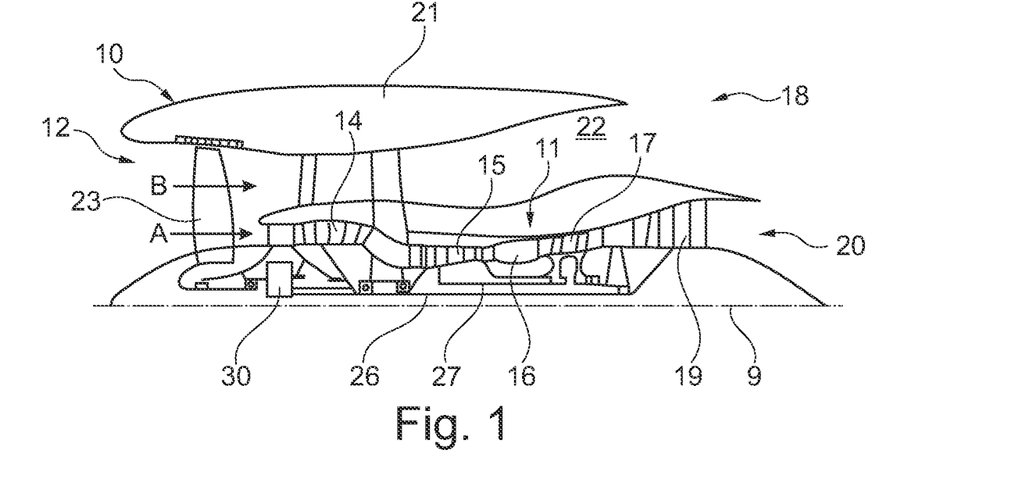
FIG. 1 a sectional side view of a gas turbine engine.

FIG. 1 illustrates a gas turbine engine 10 having a main axis of rotation 9. The engine 10 comprises an air intake 12 and a fan 23 that generates two air flows: a core air flow A and a bypass air flow B. The gas turbine engine 10 comprises a core 11 that receives the core air flow A. When viewed in the order corresponding to the axial direction of flow, the core engine 11 comprises a low-pressure compressor 14, a high-pressure compressor 15, a combustion device 16, a high-pressure turbine 17, a low-pressure turbine 19, and a core thrust nozzle 20. An engine nacelle 21 surrounds the gas turbine engine 10 and defines a bypass duct 22 and a bypass thrust nozzle 18. The bypass air flow B flows through the bypass duct 22. The fan 23 is attached to and driven by the low-pressure turbine 19 via a shaft 26 and an epicyclic planetary gear box 30.

During operation, the core air flow A is accelerated and compressed by the low-pressure compressor 14 and directed into the high-pressure compressor 15, where further compression takes place. The compressed air expelled from the high-pressure compressor 15 is directed into the combustion device 16, where it is mixed with fuel and the mixture is combusted. The resulting hot combustion products then propagate through the high-pressure and the low-pressure turbines 17, 19 and thereby drive said turbines, before being expelled through the nozzle 20 to provide a certain propulsive thrust. The high-pressure turbine 17 drives the high-pressure compressor 15 by way of a suitable connecting shaft 27. The fan 23 generally provides the major part of the propulsive thrust. The epicyclic planetary gear box 30 is a reduction gear box.

Figure 2:
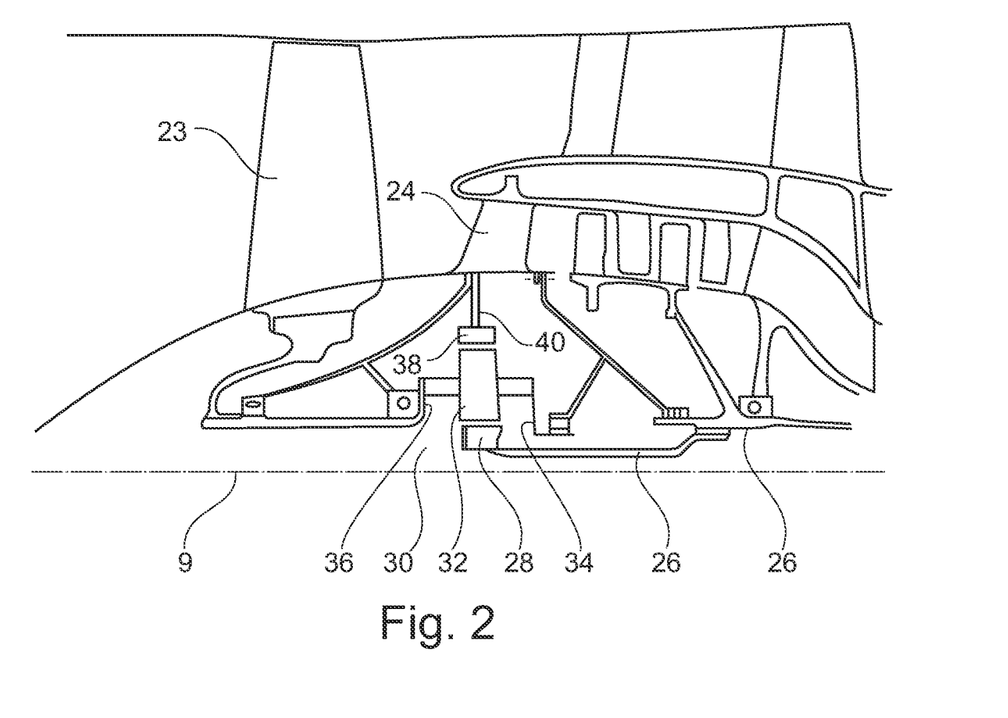
FIG. 2 shows a close-up sectional side view of an upstream portion of a gas turbine engine.

An exemplary arrangement for a geared fan gas turbine engine 10 is shown in FIG. 2. The low-pressure turbine 19 (see FIG. 1) drives the shaft 26, which is coupled to a sun wheel 28 of the epicyclic planetary gear mechanism 30. Multiple planet gears 32, which are coupled to one another by a planet carrier 34, are situated radially to the outside of the sun gear 28 and mesh therewith. The planet carrier 34 guides the planet gears 32 in such a way that they circulate synchronously around the sun gear 28, whilst enabling each planet gear 32 to rotate about its own axis. The planet carrier 34 is coupled via linkages 36 to the fan 23 in order to drive its rotation about the engine axis 9. An external gear or ring gear 38 that is coupled via linkages 40 to a stationary support structure 24 is situated radially to the outside of the planet gears 32 and meshes therewith.

It should be noted that the expressions "low-pressure turbine" and "low-pressure compressor", as used herein, can be taken to mean the lowest-pressure turbine stage and lowest-pressure compressor stage (i.e. not including the fan 23), respectively, and/or the turbine and compressor stages that are connected together by the connecting shaft 26 with the lowest rotational speed in the engine (i.e. not including the gear box output shaft that drives the fan 23). In some documents, the "low-pressure turbine" and the "low-pressure compressor" referred to herein may alternatively be known as the "intermediate-pressure turbine" and "intermediate-pressure compressor". Where such alternative nomenclature is used, the fan 23 may be referred to as a first, or lowest-pressure, compression stage.

Figure 3:
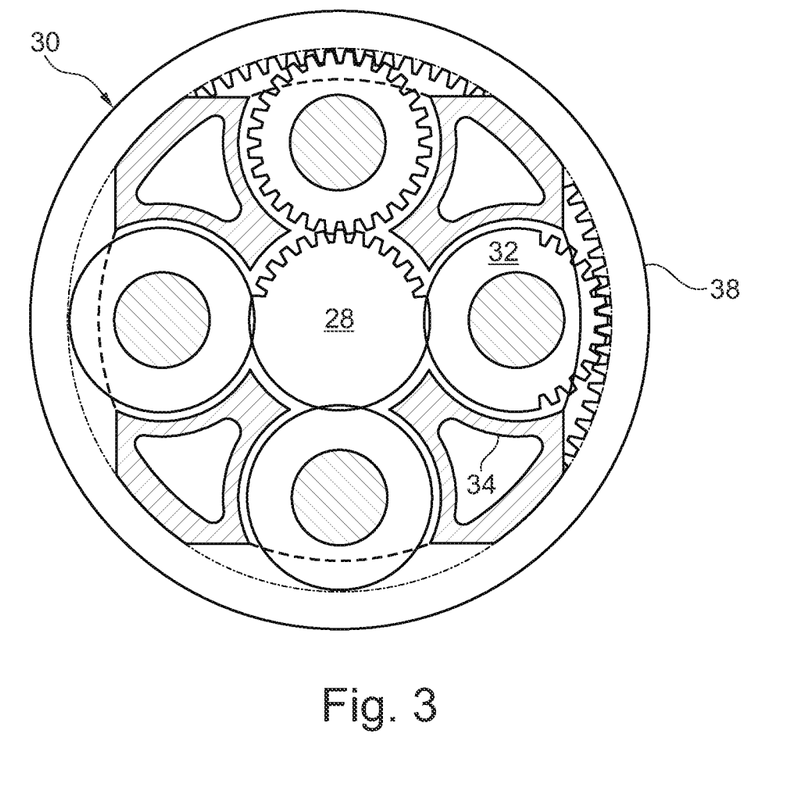
FIG. 3 shows a partially cut-away view of a gear mechanism for a gas turbine engine.

The epicyclic planetary gear box 30 is shown in greater detail by way of example in FIG. 3. The sun gear 28, planet gears 32 and ring gear 38 in each case comprise teeth on their periphery to allow meshing with the other toothed gears. However, for clarity, only exemplary portions of the teeth are illustrated in FIG. 3. Although four planet gears 32 are illustrated, it will be apparent to a person skilled in the art that more or fewer planet gears 32 may be provided within the scope of protection of the claimed invention. Practical applications of an epicyclic planetary gear box 30 generally comprise at least three planet gears 32.

The epicyclic planetary gear box 30 illustrated by way of example in FIGS. 2 and 3 is a planetary gear box in which the planet carrier 34 is coupled to an output shaft via linkages 36, with the ring gear 38 being fixed. However, any other suitable type of planetary gear box 30 may be used. As a further example, the planetary gear box 30 may be a star arrangement, in which the planet carrier 34 is held fixed, with the ring gear (or external gear) 38 being allowed to rotate. In such an arrangement, the fan 23 is driven by the ring gear 38. As a further alternative example, the gear box 30 may be a differential gear box in which both the ring gear 38 and the planet carrier 34 are allowed to rotate.

It is self-evident that the arrangement shown in FIGS. 2 and 3 is merely an example, and various alternatives fall within the scope of protection of the present disclosure. Purely by way of example, any suitable arrangement can be used for positioning the gear box 30 in the engine 10 and/or for connecting the gear box 30 to the engine 10. By way of a further example, the connections (such as the linkages 36, 40 in the example of FIG. 2) between the gear box 30 and other parts of the engine 10 (such as the input shaft 26, the output shaft and the fixed structure 24) may have a certain degree of stiffness or flexibility. As a further example, any suitable arrangement of the bearings between rotating and stationary parts of the engine 10 (for example between the input and output shafts of the gear box and the fixed structures, such as the gear casing) may be used, and the disclosure is not limited to the exemplary arrangement of FIG. 2. For example, where the gear box 30 has a star arrangement (described above), the person skilled in the art would readily understand that the arrangement of output and support linkages and bearing positions would typically be different to that shown by way of example in FIG. 2.

Accordingly, the present disclosure extends to a gas turbine engine having any arrangement of gear box types (for example star-shaped or epicyclic-planetary), support structures, input and output shaft arrangement, and bearing positions.

Optionally, the gear box may drive additional and/or alternative components (for example the intermediate-pressure compressor and/or a booster compressor).

Other gas turbine engines in which the present disclosure can be used may have alternative configurations. For example, such engines may have an alternative number of compressors and/or turbines and/or an alternative number of connecting shafts. By way of a further example, the gas turbine engine shown in FIG. 1 has a split flow nozzle 20, 22, meaning that the flow through the bypass duct 22 has its own nozzle that is separate from and radially outside the core engine nozzle 20. However, this is not restrictive, and any aspect of the present disclosure can also apply to engines in which the flow through the bypass duct 22 and the flow through the core 11 are mixed or combined before (or upstream of) a single nozzle, which may be referred to as a mixed flow nozzle. One or both nozzles (whether mixed or split flow) can have a fixed or variable region. Although the example described relates to a turbofan engine, the disclosure may be applied for example to any type of gas turbine engine, for example an open-rotor engine (in which the fan stage is not surrounded by an engine nacelle) or a turboprop engine.

The geometry of the gas turbine engine 10, and components thereof, is/are defined by a conventional axis system, which comprises an axial direction (which is aligned with the axis of rotation 9), a radial direction (in the direction from bottom to top in FIG. 1), and a circumferential direction (perpendicular to the view in FIG. 1). The axial, radial and circumferential directions are mutually perpendicular.

The planetary gear box 30 of the gas turbine engine 10 must, in particular in turbofan engines, function for a very long time without maintenance. Therefore an efficient and robust lubrication, here with oil, is of particular importance. The flow of lubricating oil in the interior of the planetary gear box 30 must take into account the ageing of the oil. The examples illustrated here concern planetary gear boxes 30 in which planet gears 34 are driven by a sun gear 28. The output takes place via the planet carrier 34. The ring gear 38 is here static. In principle however, other planet gear configurations may also be used.

The description below illustrates embodiments in which a flow guidance means 50 serves to guide a planet gear lubricant stream S (i.e. here an oil stream). For visualisation, oil droplets are depicted as small black dots.

For lubrication, via an oil supply 55, a sun gear lubricant stream S1 is directed in targeted fashion at the engagement of the sun gear 28 and planet gears 32. The sun gear 28 here rotates clockwise, and the planet gears 32 accordingly rotate counter-clockwise.

Figure 4:
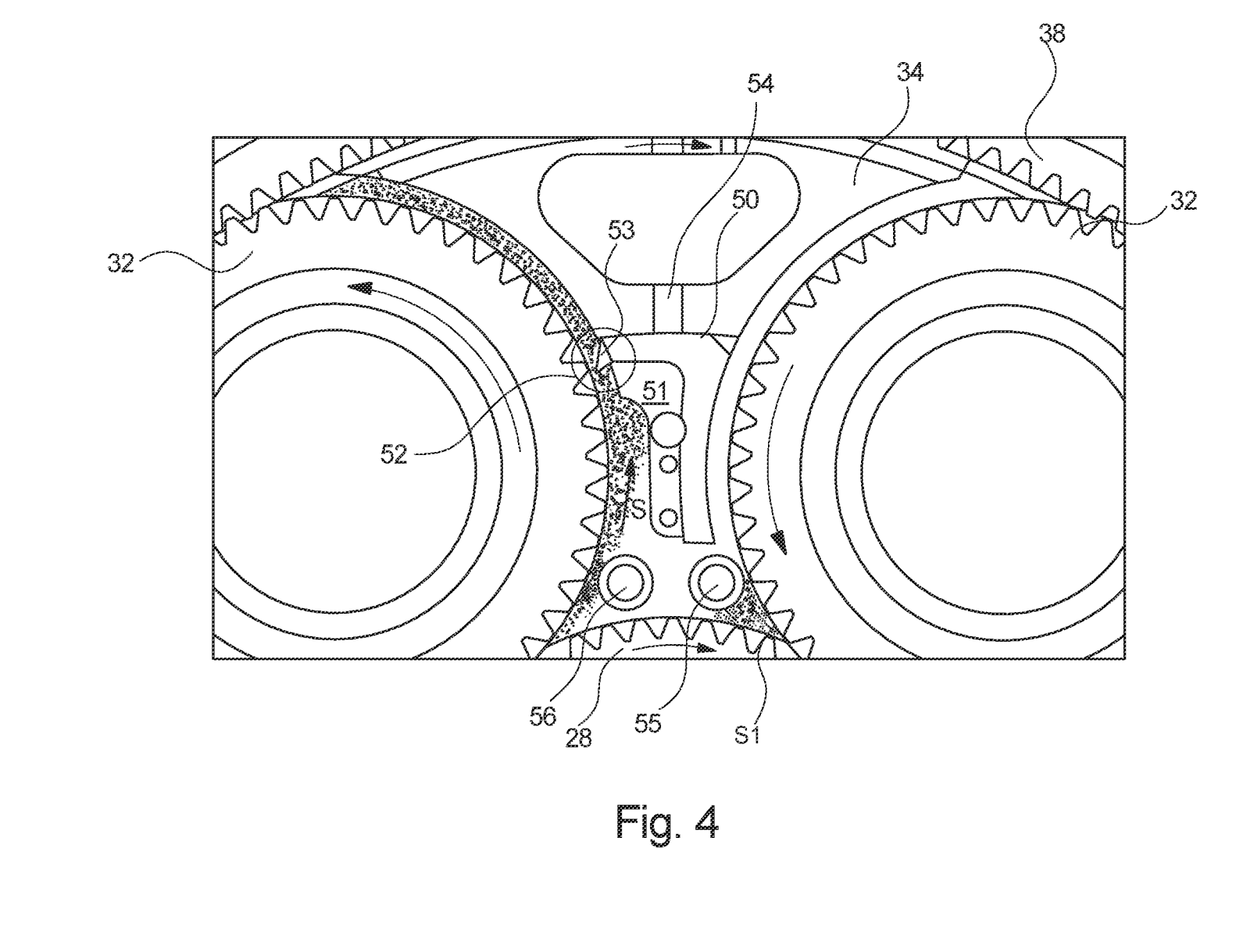
FIG. 4 shows a sectional view through a part of an embodiment of a planetary gear box with a flow guidance means for a planet gear lubricant oil stream.

FIG. 4 shows the main flow direction of the sun gear lubricant stream S1 as an arrow which is directed at the engagement of the planet gear 32 and sun gear 28.

Furthermore, the embodiment of the planetary gear box 30 has an oil supply 56 for a planet gear lubricant stream S, the main flow direction of which is oriented at least partially along the tooth surfaces and/or along the periphery of the planet gear 32 after the engagement with the sun gear 28. The oil, drawn in by the engagement between the planet gears 32 and sun gear 28, is then situated between the tooth flanks of the planet gears 32 and sun gear 28, and is here subjected to a centrifugal force and transported radially outward.

Because of a blocking of the oil supply by the planet gear lubricant stream S (cooling oil spray 56) and the centrifugal force from the rotation of the planet carrier 34, and because the planet gear 32 trails the outflung oil in the same direction (rotation of the planet carrier 32), an outwardly directed oil stream S is created which follows the contour of the planet gear 32 (centrifugal force from the rotating planet carrier 34). The trajectory of the planet gear lubricant stream S is formed in particular by the blockade of the lubricant jet at the exit from the engagement between the planet gear 32 and sun gear 28.

As shown below, an additional advanced edge 53 of a flow guidance device 50 can guide the planet gear lubricant stream S more effectively into a collecting region 51 of the oil guidance component 50.

The main flow direction of this planet gear lubricant stream S is initially oriented substantially tangentially to the tooth face of the planet gear 32. The rotation and flow inside the gear casing expand the planet gear lubricant stream S (illustrated as dots). This can be seen for example from the formation of a cloud of dots.

The flow guidance device 50, the geometric formation of which is described below, serves to form the planet gear lubricant stream S and conduct this partially out of the gear region in order to avoid secondary losses. These would occur if the oil of the planet gear lubricant stream S were conveyed further by the planet gear 32 in the direction of another planet gear 32 or in the direction of the ring gear 38. Because of the rotation of the planet carrier 34, a radially outward flow would then occur.

In order to prevent or at least reduce this, the flow guidance device 50 has a collecting region 51 in which the planet gear lubricant stream S between a planet gear 32 and the flow guidance device 50 can be captured. The collecting region 51 thus prevents an uncontrolled propagation of the planet gear lubricant stream S into the gear casing. Furthermore, the collecting region 51 has an outlet region 52 which is arranged between the flow guidance device 50 and the tooth surface of the planet gear 32. At least a part of the planet gear lubricant stream S can flow out here between the flow guidance device 50 and along the tooth surfaces and/or the periphery of the planet gear 32.

In particular to form this outflow, an edge 53 is arranged in the region of the outlet region 52 for defined constriction of the passage for the planet gear lubricant stream S. The edge 53 is made sharp, so it is not designed as a type of nozzle which conducts the planet gear lubricant stream S.

The edge 53 shears off a part of the planet gear lubricant stream S and retains it in the collecting region 51. From the collecting region 51, the lubricating oil can be discharged from the immediate area of the tooth engagements via an oil discharge device 54, so that secondary losses at the planet gears and ring gear, and oil ageing, are reduced.

Figure 5A:
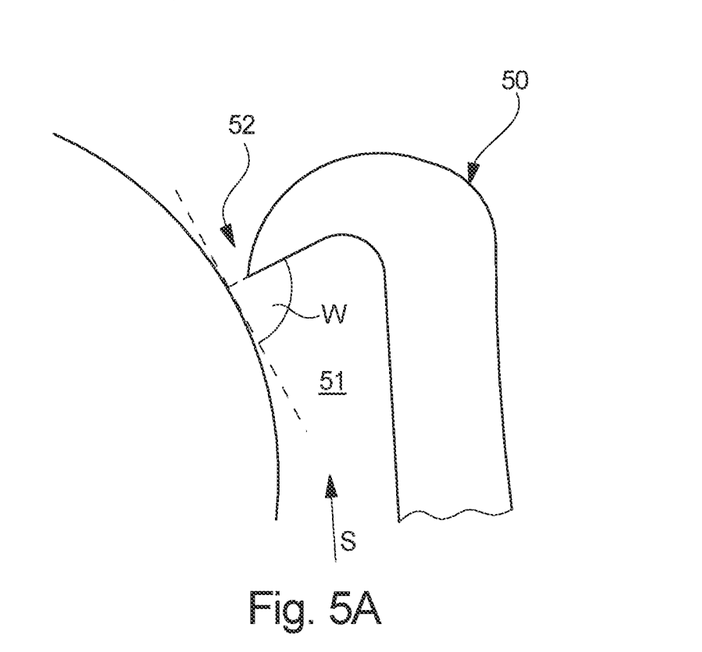
FIG. 5A shows a schematic detail view of a first embodiment with an edge for controlling the planet gear lubricant stream.

The edge 54 should be made sharp relative to the planet gear 32, i.e. it is formed in particular at least at a right angle W to the planet gear 32 (see e.g. FIGS. 5A, 5B) when the edge is projected onto a tangent at the planet gear 32 (see FIG. 5A). The edge 54 is shown as a dot in FIG. 4.

Figure 5B:
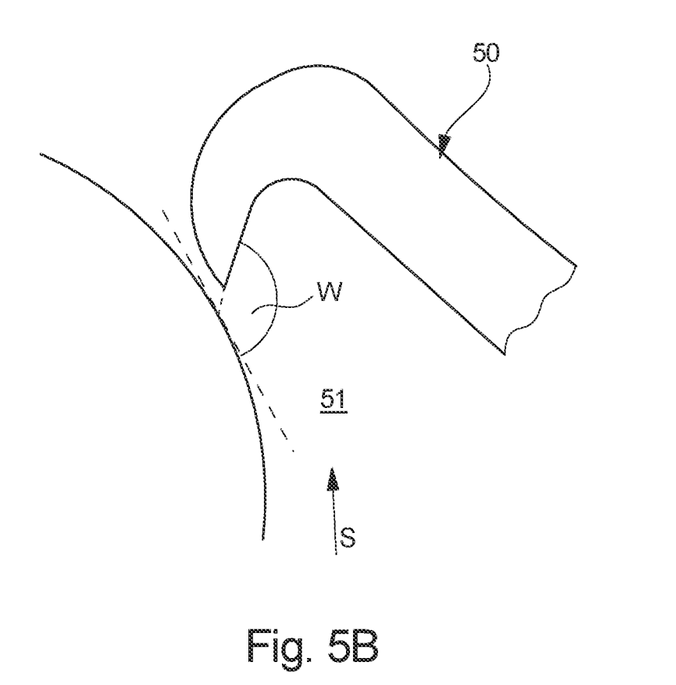
FIG. 5B shows a schematic detail view of a second embodiment with an edge for controlling the planet gear lubricant stream.

The angle W (measured in the rotational direction of the schematically illustrated planet gear 32 and again projected onto a tangent to the planet gear 32) may also be greater than 90°, in particular however less the 180° (see FIG. 5B). This ensures that the planet gear lubricant stream S meets a sharp edge when flowing out of the collecting region 51.

The flow cross-section of the outlet region 52 of the collecting region 51, i.e. the gap width which is delimited on one side by the edge 53, may in typical applications lie between 0.5 and 4 mm. In principle, this gap should be as small as possible.

For an efficient flow guidance, the main flow of the planet gear lubricant stream S is oriented substantially (e.g. +/−10°) onto the edge 54, the outlet region 52 or the collecting region 51, i.e. the planet gear lubricant stream S leaves the oil supply 56 in this direction.

As a whole, the introduction of the edge 53 brings a significant increase in the captured proportion of the planet gear lubricant stream S. This reduces the ageing of the oil, the temperature of the oil and losses at the gear box. The reduction in contacts means that less oil is required, so that weight can be saved. A fuel saving may lie in the region of 0.05 to 0.1%.

Figure 6:
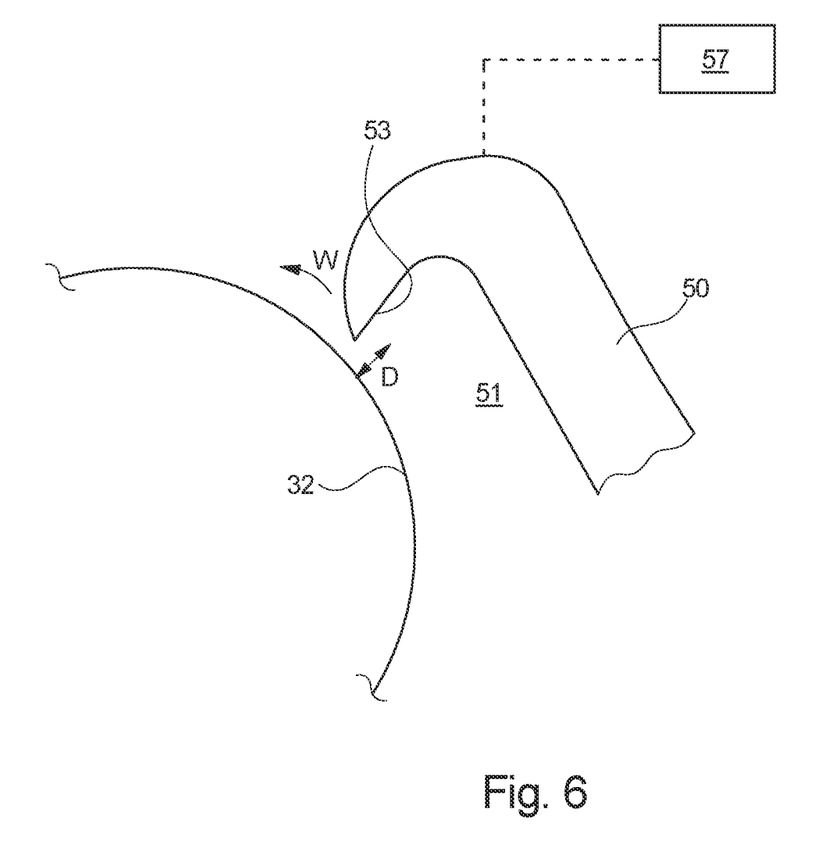
FIG. 6 shows a schematic illustration of an embodiment with an adjustable flow guidance device.

FIG. 6 shows an embodiment in which an adjustment device 57 may adjust a distance D between the edge 53 of the flow guidance device 50 and the planet gear 32 (here illustrated schematically), in order to control the planet gear lubricant stream S. In addition or alternatively, the angle W may also be adjusted by the adjustment device 57.

Figure 7:
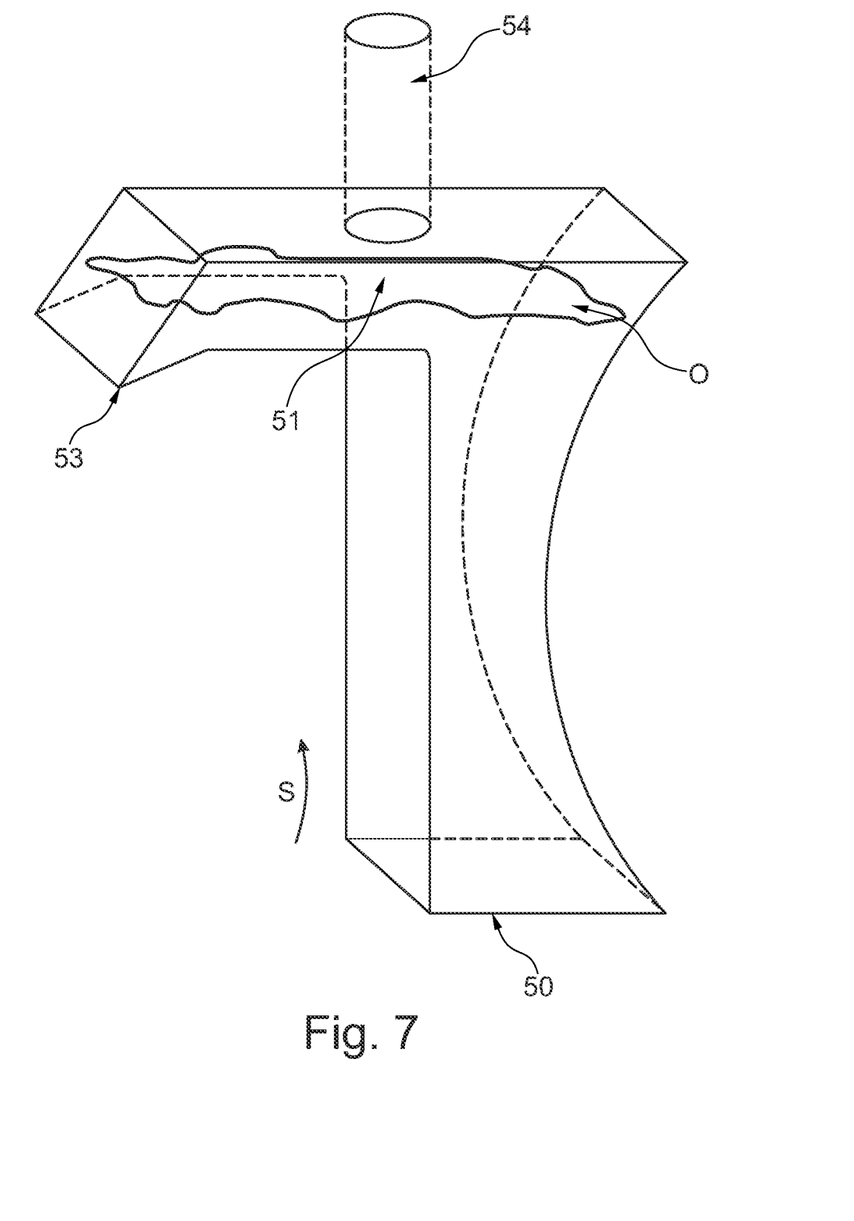
FIG. 7 shows a schematic illustration of an embodiment with a flow guidance device with portions opened to the collecting region.

FIG. 7 shows an embodiment of a flow guidance device 50 in a 3D illustration. This view corresponds approximately to the side view of FIG. 4 in the axial direction. However, in FIG. 7, a part of an oil level O is marked which lies inside the gear casing (illustrated here).

In the illustration of FIG. 7, the planet gear lubricant stream S enters from below and is delimited by the sharp edge 53 as described above, wherein the planet gear lubricant stream S then flows along the planet gear (not shown here) in a similar fashion to the embodiment in FIG. 4.

The interior of the flow guidance device 50 (here shown opened) is here formed partially as a blade or channel so that the oil level O in the interior is visible.

A section through the flow guidance device 50 approximately in the radial direction would show a U-shaped profile. The concave side of the blade-like or channel-like part of the flow guidance device 50 is open to the collecting region 51 (here from above and to the left) and is thus a part of the collecting region 51. Here, the channel-like formation is arranged on the upper part and on the vertical part, so that oil can sit there.

Some of the oil is then discharged via the oil discharge device 54.

It goes without saying that the invention is not limited to the embodiments described above, and various modifications and improvements can be made without departing from the concepts described herein. Any of the features may be used separately or in combination with any other features, unless they are mutually exclusive, and the disclosure extends to and includes all combinations and subcombinations of one or more features that are described herein.

LIST OF REFERENCE SIGNS

9 Main rotation axis
10 Gas turbine engine
11 Core engine
12 Air inlet
14 Low-pressure compressor
15 High-pressure compressor
16 Combustion device
17 High-pressure turbine
18 Bypass thrust nozzle
19 Low-pressure turbine
20 Core thrust nozzle
21 Engine nacelle
22 Bypass duct
23 Fan
24 Stationary support structure
26 Shaft
27 Connecting shaft
28 Sun gear
30 Gear box, planetary gear box
32 Planet gears
34 Planet carrier
36 Linkage
38 Ring gear
40 Linkage
50 Flow guide device
51 Collecting region
52 Outlet region of collecting region
53 Edge
54 Oil discharge device
55 Oil supply for sun gear lubricant stream S1
56 Oil supply for planet gear lubricant stream S
A Core air flow
B Bypass air flow
O Oil level
S Planet gear lubricant stream
S1 Sun gear lubricant stream
W Angle

The invention claimed is:

1. A planetary gear box, comprising:
a flow guidance device for a planet gear lubricant stream in the planetary gear box, which is directed at least partially along a planet gear, after an engagement with a sun gear,
a collecting region of the flow guidance device in which the planet gear lubricant stream between the planet gear and the flow guidance device is at least partially captured,
wherein the collecting region has an outlet region between the flow guidance device and a tooth face of the planet gear for at least a part of the planet gear lubricant stream, and
an edge arranged at the outlet region for defined constriction of a passage for the planet gear lubricant stream, wherein the edge is a sharp edge having an included angle between faces of less than 90° and is angled backward toward a rotational direction of the tooth face of the planet gear.

2. The planetary gear box according to claim 1, wherein an angle, measured in a rotational direction of the planet gear between the edge and a tangent to the planet gear, is greater than 90°, and less than 180°.

3. The planetary gear box according to claim 1, wherein a main flow direction of the planet gear lubricant stream is oriented from an oil supply onto the collecting region of the flow guidance device, the edge or the outlet region of the flow guidance device.

4. The planetary gear box according to claim 3, wherein an orientation of the main flow direction of the planet gear lubricant stream deviates by +/−20° from an exact linear geometric orientation.

5. The planetary gear box according to claim 1, wherein a sun gear lubricant stream is oriented from an oil supply onto an engagement between the sun gear and the planet gear.

6. The planetary gear box according to claim 1, wherein the collecting region of the flow guidance device is fluidically connected to an oil discharge device.

7. The planetary gear box according to claim 1, wherein a flow cross-section of the outlet region of the collecting region is between 0.5 mm and 4 mm.

8. The planetary gear box according to claim 1, and further comprising an adjustment device, wherein a flow cross-section of the outlet region of the collecting region is adjustable by the adjustment device.

9. The planetary gear box according to claim 8, wherein the adjustment device is configured to adjust at least one chosen from an angle of the edge relative to the planet gear and a distance between the flow guidance device and the planet gear.

10. The planetary gear box according to claim 1, wherein the flow guidance device has at least partially a concave region which is open to the collecting region and is part of the collecting region.

11. A gas turbine engine for an aircraft, comprising:
a core engine comprising a turbine, a compressor, and a core shaft connecting the turbine to the compressor;
a fan, which is positioned upstream of the core engine, wherein the fan comprises a plurality of fan blades; and
a gear box, which can be driven by the core shaft, wherein the fan can be driven by means of the gear box at a lower speed than the core shaft,
wherein the gear box is the planetary gear box according to claim 1.

12. The planetary gear box according to claim 1, wherein an angle, measured in a rotational direction of the planet gear between the edge and a tangent to the planet gear, is greater than 90° and less than 120°.

13. The planetary gear box according to claim 3, wherein an orientation of the main flow direction of the planet gear lubricant stream deviates by +/−10° from an exact linear geometric orientation.

* * * * *